United States Patent
Lauter et al.

(10) Patent No.: US 8,180,047 B2
(45) Date of Patent: May 15, 2012

(54) TRAPDOOR PAIRINGS

(75) Inventors: Kristin E. Lauter, La Jolla, CA (US);
Denis Charles, Redmond, WA (US);
Anton Mityagin, La Jolla, CA (US)

(73) Assignee: Microsoft Corporation, Redmond, WA (US)

( * ) Notice: Subject to any disclaimer, the term of this patent is extended or adjusted under 35 U.S.C. 154(b) by 1400 days.

(21) Appl. No.: 11/275,560

(22) Filed: Jan. 13, 2006

(65) Prior Publication Data
US 2007/0165843 A1   Jul. 19, 2007

(51) Int. Cl.
*H04L 9/00* (2006.01)

(52) U.S. Cl. ............ 380/30; 380/28; 380/282; 380/277; 713/168; 713/176

(58) Field of Classification Search .................... 380/28, 380/30, 83, 282, 285, 277; 713/176, 168
See application file for complete search history.

(56) References Cited

U.S. PATENT DOCUMENTS

| | | | |
|---|---|---|---|
| 5,442,707 A | | 8/1995 | Miyaji et al. |
| 5,577,124 A * | | 11/1996 | Anshel et al. ................. 380/46 |
| 5,751,808 A * | | 5/1998 | Anshel et al. ................. 713/168 |
| 6,212,279 B1 | | 4/2001 | Reiter et al. |
| 6,252,959 B1 * | | 6/2001 | Paar et al. ....................... 380/28 |
| 6,415,032 B1 * | | 7/2002 | Doland ........................ 380/255 |
| 6,611,597 B1 * | | 8/2003 | Futa et al. ........................ 380/30 |
| 7,024,559 B1 | | 4/2006 | Solinas |
| 2003/0081771 A1 * | | 5/2003 | Futa et al. ........................ 380/30 |
| 2003/0081785 A1 * | | 5/2003 | Boneh et al. ................... 380/277 |
| 2004/0123110 A1 * | | 6/2004 | Zhang et al. .................. 713/176 |
| 2004/0131191 A1 * | | 7/2004 | Chen et al. .................... 380/282 |
| 2004/0139029 A1 * | | 7/2004 | Zhang et al. ..................... 705/74 |
| 2005/0005125 A1 * | | 1/2005 | Zhang et al. .................. 713/176 |
| 2005/0018850 A1 * | | 1/2005 | Venkatesan et al. .......... 380/277 |
| 2005/0018851 A1 * | | 1/2005 | Venkatesan et al. .......... 380/277 |
| 2005/0025311 A1 * | | 2/2005 | Eisentraeger et al. .......... 380/28 |
| 2005/0036606 A1 * | | 2/2005 | Eisentraeger et al. .......... 380/28 |
| 2005/0094806 A1 * | | 5/2005 | Jao et al. ........................... 380/30 |
| 2005/0102512 A1 * | | 5/2005 | Goh et al. ....................... 713/168 |
| 2005/0262353 A1 * | | 11/2005 | Gentry et al. ................. 713/176 |

FOREIGN PATENT DOCUMENTS
GB    2389678 A    12/2003
(Continued)

OTHER PUBLICATIONS
Hankerson, "Elliptic Curve Arithmetic", pp. 1-42.
(Continued)

*Primary Examiner* — Jeffrey C. Pwu
*Assistant Examiner* — Michael D Anderson
(74) *Attorney, Agent, or Firm* — Lee & Hayes, PLLC

(57) ABSTRACT

Systems and methods are described for trapdoor pairing. In one implementation, a trapdoor pairing is a cryptographic primitive generated by determining a bilinear pairing between an elliptic curve group and another group and selecting a parameter of the bilinear pairing, such as a group order or an isogeny between curves, to be a key for generating and evaluating the bilinear pairing. Trapdoor pairing allows construction of a group in which the Decisional Diffie-Hellman (DDH) problem is computationally infeasible given only the description of the group, but is easy given the secret key. Exemplary trapdoor pairing constructions have general applicability to cryptography and also lend themselves more specifically to certain special practical implementations, such as public key cryptography and certificate authority infrastructures.

17 Claims, 5 Drawing Sheets

FOREIGN PATENT DOCUMENTS

| | | |
|---|---|---|
| JP | 11212458 | 8/1999 |
| JP | 2000137436 | 5/2000 |
| JP | 2000181347 | 6/2000 |
| JP | 2004177582 | 6/2004 |
| JP | 2005500740 | 1/2005 |

OTHER PUBLICATIONS

Miret et al., Isogeny cordillera algorithm to obtain cryptographically good, Jan. 2007, ACSW'07: Proceedings of the fifth Australasian symposium on ACSW Frontiers—vol. 68. Publisher: Australiam Computer Society Inc. pp. 153-157.

Sakai, Yasuyuki, et al., "Efficient Scalar Multiplications on Elliptic Curves with Direct Computations of Several Doublings" Jan. 2001, IEICE Transactions on Fundamentals of Electronics, Communications, and Computer Sciences, Engineering Sciences Society, Tokyo JP, vol. E84-A, No. 1, 10 pages.

Gutub, et al., "High Radix Parallel Architecture for GF(P) Elliptic Curve Processor", Proceedings of the 2003 IEEE International Conference on Acoustics, Speech, and Signal Processing, vol. 2, Apr. 6, 2003, pp. 625-628.

Blake, Ian et al., "Elliptic Curves in Cryptography" Chapter IV "Efficient Implementation of Elliptic Curves" 1999, Cambridge University Press, pp. 1-25.

Sakai, Yasuyuki, et. al., "Efficient Scalar Multiplications on Elliptic Curves without Repeated Doublings and Their Practical Performance", 2000, Springer Berlin Heidelberg, pp. 1-15.

Dutta et al., "Pairing-Based Cryptographic Protocols: A Survey" Cryptology Reasearch Group, Feb. 6, 2004, pp. 1-45.

Guajardo et al., "Efficient Algorithms fo Elleptic Curve Cryptosystems" Berlin, Springer, DE, Conf. 17, Aug. 17, 1997, pp. 342-356.

Lopez et al., "An Improvement of the Guafardo-Paar Method for Multiplication on Non-Supersingular Elliptic Curves" Nov. 9, 1998, pp. 91-95.

Aoki, et al., "Elliptic Curve Arithmetic Using SIMD," Lecture Notes in Computer Science, vol. 2200, pp. 235-247, Oct. 22, 2001.

Itoh, et al., "Fast Implementation of Public-Key Cryptology on a DSP TMS320C6201", Lecture Notes in Computer Science, vol. 1717, 1999, pp. 61-72.

Izu, et al., "Fast Elliptic Curve Multiplications with SIMD Operations," IEICE Transactions on Fundamentals, vol. E87-A, No. 1, pp. 85-93, Jan. 2004.

The Japanese Office Action mailed Jul. 29, 2011 for Japanese patent application No. 2006-071592, a counterpart foreign application of US patent No. 7,680,268, 3 pages.

The Japanese Office Action mailed Aug. 26, 2011 for Japanese patent application No. 2006-071591, a counterpart foreign application of US patent No. 7,702,098, 3 pages.

Blake, et al., "Elliptic Curves in Cryptography," Pearson Education, Dec. 20, 2001, pp. 45-49.

Blake, et al., "Elliptic Curves in Cryptography," Cambridge University Press, 1999, pp. 42-46.

Garefalakis, T., "The Generalized Weil Pairing and the Discrete Logarithm Problem on Elliptic Curves," Lecture Notes in Computer Science, vol. 2286, pp. 118-130, 2002.

The Japanese Office Action mailed Sep. 27, 2011 for Japanese patent application No. 2006-020935, a counterpart foreign application of US patent No. 7,594,261, 3 pages.

Silverman, "The Arithmetic of Elliptic Curves," Springer-Verlag New York, Inc., 1986, p. 107.

Tate, et al., "Group schemes of prime order," Annales scientifiques de L.E.N. S. serie, tome 3, No. 1, pp. 1-21, 1970.

* cited by examiner

200

DETERMINE A BILINEAR PAIRING BETWEEN AN ELLIPTIC CURVE GROUP AND ANOTHER GROUP
202

SELECT A PARAMETER OF THE BILINEAR PAIRING TO BE A KEY, WHEREIN EVALUATING THE BILINEAR PAIRING IS INFEASIBLE WITHOUT THE KEY
204

TRAPDOOR PAIRINGS

BACKGROUND

The need for stronger cryptography to secure computer-enabled communication is ever increasing. Security standards for public key cryptosystems are periodically heightened. Likewise, the need for exceptional security between users and certification authorities is growing due to the vulnerability of certification authorities to malicious interference from adversaries. These security considerations have implications for pairing-based cryptosystems, such as those that use properties of elliptic curves in an essential manner. As the heightened standards "up the ante" for the amount of security to be provided by existing systems, pairing-based cryptosystems should include some techniques that can provide exceptional security.

For introductory purposes, several concepts will now be briefly summarized. Public key cryptography is a form of cryptography that allows users to communicate securely without having prior access to a shared secret key. This is accomplished by using a pair of cryptographic keys, designated as public key and private key, related mathematically. The private key is kept secret, while the public key may be widely distributed. The public key encrypts data in a manner that only the private key of the pair can decrypt. Ideally, it is infeasible to deduce the private key of a pair from the public key.

Elliptic curve cryptography (ECC) is an approach to public-key cryptography based on the mathematics of elliptic curves, for example, on a property of elliptic curves that two points on a curve can be "added" to obtain a third point on the curve. ECC can enable using smaller keys than other techniques while providing comparable security. ECC can also enable bilinear mapping between groups based on pairings, such as Weil pairings or Tate pairings.

A "pairing," as used herein, is a cryptographic primitive that can be defined as a bilinear, non-degenerate, efficiently computable mapping over certain groups. Thus, with respect to ECC, a pairing can be a function that takes as input two points on an elliptic curve and outputs an element of some multiplicative abelian group. Furthermore, a pairing satisfies some special properties, including the abovementioned bilinearity. Because they possess these properties, pairings are relatively difficult to construct. Two pairings presently used in cryptography are the abovementioned Weil pairing and Tate pairing.

A pairing can map pairs of elements of mathematical groups, such as groups G1 and G2, to elements of a third group, such as group G3. With respect to the bilinear property: for elements P and Q from G1 and G2, respectively, and for numbers a and b, if a pairing maps (P, Q) to an element R from G3 then it maps (aP, bQ) to an element abR; for elements P and R from G1 and Q from G2 it maps (P+R,Q) to the product of the values for (P,Q) and (R,Q). It should be noted that pairing operations were first implemented on elliptic curve groups, allowing construction of some new cryptographic primitives, such as Identity-Based Encryption and Short Digital Signature schemata. Presently, pairings are an important building block for numerous cryptographic protocols.

A Weil pairing, for example, can be defined as a construction of roots of unity via operations on an elliptic curve to create a bilinear pairing on a torsion subgroup of the elliptic curve. Thus, for a fixed natural number m, the Weil pairing $e_m$ is a bilinear map that takes as input two m-torsion points on the elliptic curve, and outputs an m th root of unity. In particular, if the elliptic curve is defined over a finite field then the Weil pairing $e_m$ outputs an m th root of unity over that finite field.

The Decisional Diffie-Hellman (DDH) problem is based on the assumption that a certain computational problem within a cyclic group is hard. In a cyclic group G of order q, the DDH assumption states that, given $(g, g^a, g^b)$ for a randomly chosen generator g (and random $a, b \in \{0, \ldots, q-1\}$), the value $g^{ab}$ appears at first glance to be a perfectly random element of G. This can be stated more formally by saying that $(g, g^a, g^b, g^{ab})$—this input is called a "DDH triplet"—is indistinguishable from $(g, g^a, g^b, g^c)$ (where c is also chosen at random from $\{0, \ldots, q-1\}$). Thus, solving the DDH problem can be used for deciding if three elements of a given group constitute a valid Diffie-Hellman triplet.

If G and G' are two groups, with G written additively and G' written multiplicatively, then the DDH problem, given P, aP, bP, and cP in G, becomes deciding whether c=ab (modulo the order of P). If there exists a bilinear, non-degenerate map (a pairing) "e" where e: G×G→G', then one can efficiently solve the DDH problem in G, since c=ab if and only if e(aP, bP)=e(P, cP).

Likewise, solving the DDH problem can be applied with respect to two additive groups G1 and G2, instead of a single group G, using a pairing e: G1×G2→G'. Given P and aP in G1 and given Q and bQ in G2, where P and Q are of the same order r, the DDH problem becomes deciding whether a=b (mod r). The security of pairing-based cryptosystems is generally based on the intractability (without a map or pairing in hand) of some version of the Diffie-Hellman problem in some group G or in a pair of groups G1 and G2. As introduced above, the most popular pairing choices are Weil pairing and Tate pairing, both computable by a technique known as Miller's algorithm. The Tate pairing is considered by some to be more easily used in practical applications than the Weil pairing.

SUMMARY

Systems and methods are described for trapdoor pairing. In one implementation, a trapdoor pairing is a cryptographic primitive generated by determining a bilinear pairing between an elliptic curve group and another group and selecting a parameter of the bilinear pairing, such as a group order or an isogeny between curves, to be a key for generating and evaluating the bilinear pairing. Trapdoor pairing allows construction of a group in which the Decisional Diffie-Hellman (DDH) problem is computationally infeasible given only the description of the group, but is easy given the secret key. Exemplary trapdoor pairing constructions have general applicability to cryptography and also lend themselves more specifically to certain special practical implementations, such as public key cryptography and certificate authority infrastructures.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

This disclosure describes exemplary trapdoor pairings for cryptographic purposes. A trapdoor pairing is keyed bilinear map, that is, a pairing construction that is easy to evaluate if the evaluator has secret "trapdoor" information (the "key") but is hard or infeasible to evaluate if the evaluator does not have the secret trapdoor information. Trapdoor pairing thus allows construction of a group G where the Decisional Diffie-Hellman (DDH) problem is computationally infeasible given only the description of the group, but is easy given the secret key. Exemplary trapdoor pairing constructions have general applicability to cryptography and also lend themselves more specifically to certain special practical implementations, such as public key cryptography and certificate authority infrastructures.

Several exemplary trapdoor pairing constructions will be described. That is, several methods are presented for constructing groups, such as groups G1, G2, and G3, and a pairing function based on secret information, such that the pairing function (and the group G3) can only be computed by a party who possesses the corresponding secret key. Groups G1 and G2 can be public. But without access to a secret key, not only evaluating a particular pairing function is hard, but finding a pairing function from G1 and G2 to another group G3' is also computationally infeasible. A special case of a trapdoor pairing function is also presented, a variant that employs identical groups G1=G2.

The exemplary trapdoor pairing primitives presented herein provide a technology that can allow construction of new cryptographic protocols and improvement of existing cryptographic tools.

Exemplary System

Systems and methods for cryptographic application of an exemplary trapdoor pairing are described in the general context of computer-executable instructions (program modules and/or software engines) being executed by a computing device such as a personal computer. Program modules and software engines generally include routines, programs, objects, components, data structures, etc., that perform particular tasks or implement particular abstract data types. While the systems and methods are described in the foregoing context, acts and operations described hereinafter may also be implemented in hardware or combinations of hardware, software, firmware, etc.

Figure 1:
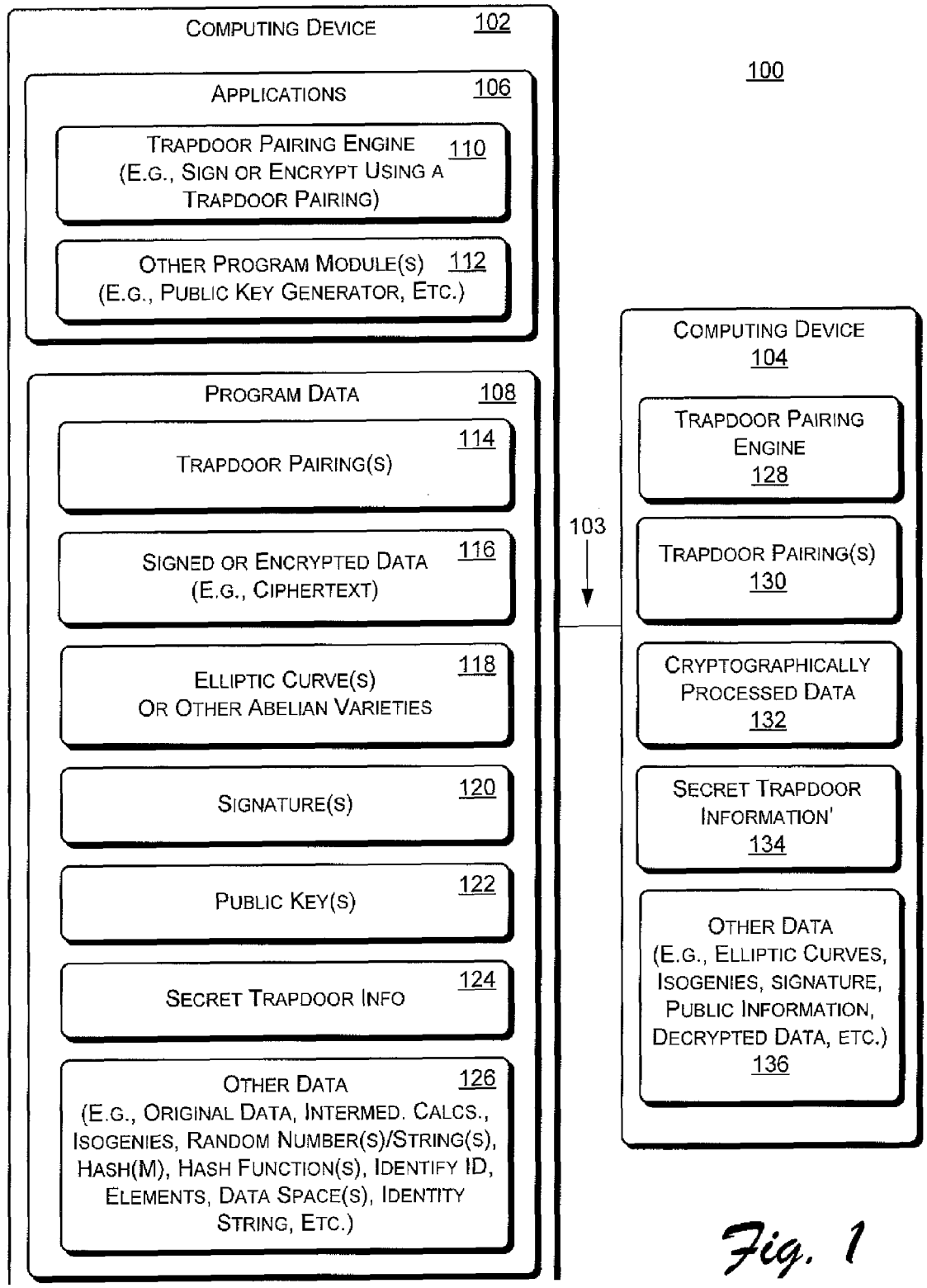
FIG. 1 is a block diagram of an exemplary system for making and using trapdoor pairings.

FIG. 1 illustrates an exemplary trapdoor pairing system 100 for cryptographic application of trapdoor pairing. The system 100 includes a first computing device 102 coupled over a communications network 103 to a second computing device 104. The system 100 can represent for example, part of a public key cryptography system and/or part of a certification authority infrastructure. Communications network 103 may include a combination of a local area network (LAN) and a general wide area network (WAN) communication environments, such as those commonplace in offices, enterprise-wide computer networks, intranets, and the Internet. First and second computing devices 102 and 104 represent many types of computing devices such as a personal computer, a laptop, a server, handheld or mobile computing device (e.g., a cellular phone, personal digital assistant), etc.

Computing device 102 includes applications 106 and program data 108. Applications 106 include, for example, trapdoor pairing engine 110 and other program modules 112. Program data 108 may include, for example, trapdoor pairings 114, signed or encrypted data 116, elliptic curves or other abelian varieties 118, signature(s) 120, public key(s) 122, secret trapdoor information 124, and other data 126. The other data 126 may include the original data, intermediate calculations, isogenies (to be described below), random numbers/strings, hash functions, group elements, data space, identity strings, certificates, etc. Trapdoor pairing engine 110 can create and evaluate trapdoor pairings 114 and may perform other cryptographic processing of data based on trapdoor pairings 114, such as signing and/or encrypting original data as a function of a trapdoor pairing 114. Such original data is shown as a respective portion of "other data" 126. Original data that has been signed or encrypted by trapdoor pairing engine 110 is shown as signed or encrypted data 116.

The other computing device 104 of FIG. 1 may have the same or similar components as device 102. When receiving signed or encrypted data 116, either computing device 102 and/or 104 may have its respective trapdoor pairing engine 110 or 128. Hence, the illustrated computing device 104 includes the trapdoor pairing engine 128, respective trapdoor pairing(s) 130, cryptographically processed data 132 (e.g., corresponding to the signed or encrypted data of computing device 102) secret trapdoor information 134 that may be unique to device 104, and other data 136, such as elliptic curves or other abelian varieties, isogenies, signatures, original data, decrypted data, etc.

The trapdoor pairing engine 110 cryptographically signs and/or encrypts original data 126 as a function of trapdoor pairing 114 thereby producing the cryptographically processed data 132 of computing device 104. Exemplary methods implemented by the trapdoor pairing engine 110 to generate a trapdoor pairing 114 and/or to utilize the trapdoor pairing 114 to cryptographically process (e.g., respectively sign or encrypt) original data 126 are described below and with reference to FIGS. 2 through 4.

The other trapdoor pairing engine 128 of computing device 104 creates and evaluates trapdoor pairings 114 and may perform other cryptographic processing of data based on trapdoor pairings 114, such as verifying or decrypting cryptographically processed data 132 based on a trapdoor pairing 130. In one mode, the trapdoor pairing engine 128 verifies cryptographically processed data 132 when the cryptographically processed data 132 has been signed as a function of a trapdoor pairing 114 and decrypts cryptographically processed data 132 that has been encrypted as a function of a trapdoor pairing 114. Cryptographically processed data 132 can thus be signed or encrypted data 116 that has been communicated by computing device 102 to computing device 104.

Exemplary Trapdoor Pairing Constructions

Four implementations of exemplary trapdoor pairings 114 will now be described. Each implementation is a different mathematical construction of an exemplary trapdoor pairing schema or primitive, which includes generating groups and/or a trapdoor pairing function. The description begins with two definitions. Each definition applies to one of more of the four exemplary constructions that follow.

Definition One

In the first definition, G1 and G2 are groups and the exemplary trapdoor pairing 114 is a keyed bilinear map, e: G1×G1→G2, which has the following properties or satisfies the following conditions:

Given only a description of G1, solving the Decisional Diffie-Hellman (DDH) problem on G1 is hard.

Given the secret trapdoor information 124, the trapdoor pairing 114 can be efficiently evaluated.

The output of evaluating the trapdoor pairing 114 can be revealed without giving information about the secret trapdoor information 124.

(Optional): |G1|=|G2| and the trapdoor pairing 114 is surjective—each element is mapped at least once.

The form |Gx| refers to the size of the group.

Group G1 is public and is typically an elliptic curve group. G2 is typically a finite field. "Group" is a mathematical term with a specific meaning of a set of elements upon which an operation on this set allows two elements to be combined in some manner into another element of the set. To be a group, the operation needs to satisfy certain operatives, which are well-known in the mathematical arts. The exemplary trapdoor pairing 114 being described is bilinear, and therefore uses two different elements of a group, (e.g., G1 in the first definition) and pairs the two elements together to produce or derive an element of the second group, G2. Bilinear, as introduced above and as well-known in the mathematical arts, means that if each of elements A and B from the first group are separately paired with element C from the first group, and then combined in the second group using an operation, this procedure would yield the same result as if A and B were combined together in the first group and then paired in the second group with element C via the operation. This symmetric property is a characteristic of bilinear mapping, much like addition and multiplication within a field, where (A+B)C is equivalent to AC+BC.

In definition one, there are conditions for the trapdoor pairing 114 to satisfy in order to actually be a trapdoor pairing 114. First the trapdoor pairing 114 is a bilinear map. Second, the trapdoor pairing 114 is keyed, that is, given secret information the trapdoor pairing 114 can be efficiently evaluated. Third, the output of the pairing can be revealed without disclosing information about the secret key. The first property is actually a property of the group, not of the trapdoor pairing 114 per se. The trapdoor pairing 114 is secure because the first property applies to the group. The first property stipulates that given only the description of the group G1, DDH on G1 is hard. That is, DDH is hard given only a triple of elements from the group G1—it will be hard to discern whether the triple is a valid DDH triple: i.e., given $g^a$, $g^b$, and $g^c$, it will be hard to discern whether $g^c$ is equal to $g^{ab}$. Again, DDH being hard means it is computationally infeasible to discern the above-described DDH validity of a given triple given only the description of the group G1 and not the secret trapdoor information 124 needed to evaluate trapdoor pairings 114.

Property four means that the size of group G1 is the same as the size of group G2, and the trapdoor pairing map is subjective (each element is mapped at least once).

Definition Two

In the second definition, G1, G2, and G3 are mathematical groups, as described above, and a trapdoor pairing 114 is a keyed bilinear map:

e: G1×G2→G3, which has the following properties or satisfies the following conditions:

Given only a description of G1 and G2 with generators P and Q. DDH on G1×G2 is hard. (Given pairs (aP, bQ) and (cP, dQ) it is computationally infeasible to check if ab=cd.)

Given the secret trapdoor information 124, the trapdoor pairing 114 can be efficiently evaluated.

The output of the trapdoor pairing 114 can be revealed without disclosing part of the secret trapdoor information 124 or even information about the secret trapdoor information 124.

The second definition allows more freedom than the first definition in terms of the groups to be used and/or created in a trapdoor pairing schema, as groups G1 and G2 can be distinctly different groups. Elements from group G1 are paired with elements of group G2 to obtain elements of G3, the third group, whereas in the first definition, the groups from which elements to be paired were selected were equal. Because groups G1 and G2 are distinct, a Diffie-Hellman variation known as "two group DDH" may be used to determine whether a received triplet is a valid Diffie-Hellman triplet in the trapdoor pairing constructions under this second definition, to be described below.

The first property under this second definition is much like the first property under the first definition, except that it is applied when the groups G1 and G2 are distinct. Thus, if aP, bQ, cP, and dQ are known, but the secret trapdoor information 124 is not known, then it would be hard to determine if ab=cd. Conditions two and three are the same or similar as conditions two and three under definition one.

First Trapdoor Pairing Implementation

The first implementation of a trapdoor pairing construction falls under the first definition, above, and thus uses elements from one group, G1, for trapdoor pairings 114. In this construction, the order of an elliptic curve E is n=pq, where p and q are primes; and the trapdoor pairing 114 is of the form e: G1×G1→G2. If the order of the elliptic curve is not pq we can work with the subgroup of pq-torsion points.

Secret trapdoor information 124—the secret key in this construction—includes p and q. G2 is also secret, where G2=<e(qP, qP)>×<e(pP, pP)>.

Public information includes: n (i.e., pq), E (the elliptic curve) over F1 (a finite field), point P of order n on elliptic curve E, G1=<P>, and a distortion map f: G1→<Q>.

The trapdoor pairing function for this first construction is denoted as: e(A, B): $e_p$(qA, qf(B)), $e_q$(pA, pf(B)). Since n is public, either p or q must be known—the secret trapdoor information 124—in order to evaluate trapdoor pairings 114 under this construction.

In this first implementation, the first property under the first definition, above, is not necessarily satisfied. So the first implementation constitutes an imperfect trapdoor pairing schema, but one that is worth describing, nonetheless, to illustrate how a trapdoor pairing function can operate. In this first construction, the trapdoor pairing 114 is a Weil pairing, denoted by ($e_p$, $e_q$) an existing bilinear map from elliptic curve E to G2, a finite field. This Weil pairing is parameterized by integers too, for example, the p of $e_p$, creating, when p is secret, a keyed Weil pairing (or trapdoor pairing 114). Since the subscript p is one of the parameters that defines this Weil pairing, if p is known (p is secret trapdoor information 124) and the elliptic curve E is known (it is public) then the trapdoor pairing function e(A, B): $e_p$(qA, qf(B)), $e_q$(pA, pf(B)) can be computed—i.e., trapdoor pairings 114 under this first construction can then be evaluated. The trapdoor pairing function above is not defined on the entire elliptic curve E, but defined only on certain p-torsion points of the elliptic curve; only at these points is the trapdoor pairing 114 evaluated.

To derive group G1, from which elements A and B originate, a point Q is dictated on the elliptic curve E such that Q, when multiplied by n, we get the identity (i.e., Q is an n-torsion point). Group G1 is the group generated by chosen point Q. The pairing function is defined as a pair of two points on two finite fields, the first value of the couple is evaluated at the point qA and qf(B), this constitutes one part of the output, and the second pan of output is evaluated at p times the first point and p times f applied to the second point (pA and pf(B)).

If the prime factorization of n is not known, then the trapdoor pairing function cannot be computed because without knowing p or q, the elements qA and pA, for example, cannot be computed. That is, it will not be possible to determine which Weil pairing to apply. So in this case, the secret p or q makes the pairing a trapdoor pairing 114.

This first construction of a trapdoor pairing schema presents an informative example, however, although the Weil pairing cannot be evaluated without knowing p or q, an adversary could compute another pairing on the group, which might allow the adversary to decrypt without a key in an application using this first construction. In other words, just because one cannot compute the trapdoor pairing 114 under this first construction without the secret trapdoor information 124 does not mean that an adversary could not solve DDH in this first construction by some other technique.

Second Trapdoor Pairing Implementation

The second implementation is a trapdoor pairing construction improved over the first construction described above and also falling under the first definition given above. This construction uses elements from one group, G1, for trapdoor pairings 114. In this second construction, the order of elliptic curve E is again n and the trapdoor pairing 114 is of the form e: G1×G1→G2.

The secret trapdoor information 124—the secret key in this construction—includes p, q, and rs, the divisor of the group order, $|E(Z_n)|$. ($Z_n$ denotes the set of integers modulo n). The numbers r and s are distinct (e.g., both primes). G2 is also secret.

Public information includes: n (i.e., pq), E (the elliptic curve) over $Z_n$, and point P of order rs on elliptic curve E.

The trapdoor pairing function for this second construction is denoted: e(A, B): $e_r$(sA, sf(B)) over $Z_p$, $e_s$(rA, rg(B)) over $Z_q$, where f and g are distortion maps for the r and s torsion subgroups respectively, a technical point that is used when evaluating pairing functions. Secret trapdoor information 124 that includes both rs and either p or q (since n is public) must be known to evaluate trapdoor pairings 114 under this construction.

This second construction has a similar set up as the first construction, but more information is used in the trapdoor pairing schema, i.e., n is the product of two primes p and q, and rs is a factorization of the divisor of the group order of elliptic curve E over $Z_n$. $|E(Z_n)|$ denotes a certain size group of points on the elliptic curve E which have their coordinates in the range $Z_n$. The numbers r and s are two factors of the divisor of the group order $|E(Z_n)|$.

The secret trapdoor information 124 is p, q, and rs. It is well-known that determining the group order of points on an elliptic curve over $Z_n$ is difficult if the factorization of n is not known. Thus, if n=pq, and neither p nor q are known, then it is very difficult to determine the size of this group $|E(Z_n)|$.

In this implementation, the point P on elliptic curve E is made public but not the order rs of point P. To evaluate the trapdoor pairing 114 when rs, p, and q are known, the Weil pairing is evaluated on r-torsion points of A, with f of B (over $Z_p$ and over $Z_q$). Using the Chinese remainder theorem outputs two numbers, i.e., the outputs of the pairing: one is a number modulo p and the other is a number modulo q, but does not indicate what p and q themselves are. Thus, the Chinese remainder of these two numbers (the output) is the actual Weil (or Tate) pairing comprising the trapdoor pairing 114.

This second construction is based in part on aspects of factoring properties of elliptic curves, e.g., the elliptic curve factoring algorithm with computations done modulo n. However, by the Chinese remainder theorem, the process can be viewed separately mod p and mod q. By Lagrange's theorem, the order of any element of a group that is the order of the subgroup consisting of its powers, is a divisor of the order of the group. Thus, if an element of the group is raised to a power given by the order of the group, the identity element of the group is obtained. In this second construction, this means that given an element of the group G1, by raising the element to the power given by the order of the group, the identity of the group will be obtained and N is factored. Likewise, if the element is raised to a power that is an integer multiple of the order of the group, the identity is also obtained and N is factored.

The trapdoor pairing function of this second construction is similar to that of the first construction, with r-torsion and Weil pairing sA and sB to obtain a value of the pair, defined over a finite field, which is converted to a number modulo p. Similarly, ending with the other number s, Weil pairing at point rA and rB gives a number for q. With the output of the pairing determined modulo p and q, the Chinese remainder theorem is recruited to make the output into a number modulo n. This is the output of the pairing.

Computing this trapdoor pairing 114 without knowing the factorization of n is infeasible. Since the secret trapdoor information 124 consists of p, q, r, and s, even if an adversary factors r and s, computing this trapdoor paring function is still infeasible.

Third Trapdoor Pairing Implementation

The third implementation is a trapdoor pairing construction also under the first definition, above, and thus uses elements from one group, G1, for trapdoor pairings 114. In this construction, the order of an elliptic curve E is n; and the trapdoor pairing 114 is of the form e: G1×G1→G2.

In this third construction, secret trapdoor information 124—the secret key—includes p, q; and r, where r in this implementation is a prime divisor of the group order, $|E(Z_n)|$.

Public information includes: n (i.e., pq), E (the elliptic curve) over $Z_n$ (Z mod n, the set of integers modulo n), and point P of order r on elliptic curve E. In this implementation, the point P on elliptic curve E is made public but not the order r of point P.

The trapdoor pairing function for this third construction is denoted: e(A, B): $e_r$(A, f(B)) over $Z_p$, $e_r$(A, g(B)) over $Z_q$. Here again f and g are distortion maps of the r-torsion points but now over different fields $Z_p$ and $Z_q$.

In this third construction, instead of having r and s as two factors of the divisor of the group order $|E(Z_n)|$, the divisor of the group order is denoted solely as r. Again, $|E(Z_n)|$ denotes a certain size group of points on the elliptic curve E which have their coordinates in the range $Z_n$. So, whereas in the second construction above, where r and s are two distinct numbers (e.g., both primes) and the product of r and s is the divisor of the group order, here in the third construction, only r (usually some prime number) is the divisor of the group order.

In this implementation, the point P on elliptic curve E is made public but not the order r of point P. To evaluate the trapdoor pairing 114 when r, p, and q are known, the Weil pairing is evaluated on r-torsion points of A, with f of B (over $Z_p$ and over $Z_q$). As before in the first construction, using the Chinese remainder theorem outputs two numbers, one is a number modulo p and the other is a number modulo q, but p and q themselves are not indicated. Thus, the Chinese remainder of these two numbers is the actual Weil or Tate pairing comprising the trapdoor pairing 114.

Fourth Trapdoor Pairing Implementation

The fourth implementation is a trapdoor pairing construction under definition two, above, and thus can use elements from two groups, G1 and G2, for pairing elements. In this implementation, the secret trapdoor information 124 is an isogeny $\phi$ (phi) between two elliptic curves, wherein an isogeny of elliptic curves is an algebraic map $e_\phi$ that is also a homomorphism (enough to check identity) of groups. Let m denote the degree of the isogeny, which is equal to the size of the kernel of $\phi$, if $\phi$ is separable. For P a point on E in the kernel of $\phi$, and P' a point on E' in the kernel of the dual isogeny $\hat{\phi}$, and Q a point on E with the property that $\phi(Q)=P'$, the Cartier pairing with respect to the isogeny $\phi$ is defined as follows: $e_\phi(P, P')=e_m(P, Q)$, where $e_m(P, Q)$ is the $m^{th}$ Weil pairing on the curve E.

In this fourth implementation, the secret trapdoor information 124 is isogeny $\phi^{-1}: E_2 \rightarrow E_1$.

The public information is $<P>=\ker(\phi)$, $<Q>=\ker(\hat{\phi})$. Group G3=mth roots of 1, m is prime, and m=deg($\phi$)=the order of the group, where m is kept private.

The trapdoor pairing function is the Cartier pairing: $e_\phi(A, B):=e_m(A, \phi^{-1}B)$. It can be relatively difficult to construct $\phi$ that are easy to evaluate. An aim is to construct $\phi$ such that given $<P>$, it is still hard to find $\phi$.

In this fourth construction, Cartier pairings associated to an isogeny are used as the basis for the trapdoor pairing function. That is, an isogeny connects (i.e., maps between) two elliptic curves and can be used to evaluate a Cartier pairing, so that almost all the information of this trapdoor pairing construction can be made public, but the isogeny between the two elliptic curves is kept secret. If one does not know the isogeny, then the Cartier pairing cannot be evaluated. There are many isogenies that work successfully to map between given elliptic curves $E_1$ and $E_2$, but a specific isogeny previously constituted as the key is needed to correctly evaluate a Cartier pairing-based trapdoor pairing 114.

This fourth construction has an advantage over the second and third constructions above, which use Weil pairings (or Tate pairings). In the Weil pairing implementations, more information needs to be kept secret, because when a value of the Weil pairing is divulged, it might become possible to find the map between the groups. In this fourth implementation using Cartier pairings, the map between groups is itself the secret trapdoor information 124.

In a Cartier pairing there is typically one point from a first elliptic curve and another point from another elliptic curve. The isogeny (map) combines these points to produce an element of a finite field, G3. So, G1 is one elliptic curve, G2 is the other elliptic curve, and G3 is the resulting group from the pairing. The map between them, $e_\phi$, is the isogeny between the two elliptic curves, kept secret. A Cartier pairing is denoted by $e_\phi(-,-)$, indicating that the pairing is evaluated at elements P and P' from two different groups of points.

The properties of the Cartier pairing are well known (e.g., see Katz et al., "Arithmetic Moduli of Elliptic Curves" Princeton University Press, 1985, pp. 87-91, or Cartier, "Isogenies and duality of abelian varieties", Ann. Math., vol. 71, 1960, p. 315-351). To make other trapdoor pairing constructions, the Cartier pairing can also be implemented for any isogeny of abelian varieties. Thus to implement the Cartier pairing, it suffices to find pre-images of points under an isogeny, and to evaluate the Weil pairing.

Operations are now described through which an engine, such as the trapdoor pairing engine 110, can compute a trapdoor pairing 114 that comprises a Cartier pairing. Specifically described is how to compute the Cartier pairing if the degree of the isogeny is prime and is co-prime to the group order of the elliptic curve, or at most the square of the degree divides the group order. This covers substantially all cases of cryptographic protocol interests. This is because it is typically desirable to have prime group order, or group order equal to a large prime times a small cofactor like 2 or 3.

Let $\phi: E_1 \rightarrow E_2$ be an isogeny of elliptic curves over a finite field k. First considered is the computational the task of inverting an isogeny, i.e., given $Q \in E_2$ finding a $P \in E_1$ such that $\phi(P)=Q$. The inverse image is not unique, unless $\phi$ is an isomorphism. Multiplication by m-maps: $[m]: E \rightarrow E$. Let n=#E(k). Then, all k-rational points on E are n-torsion points. If m is an integer then $[m]=[m \mod n]$ on E(k). Assume that gcd(m,n)=1. This means that [m] gives a permutation of E(k). If $m' \equiv m^{-1} \mod n$, then the "multiplication by m'"-map, [m'], gives the inverse, since $[m'] \circ [m]=[m'm]=[m'm \mod n]=[1]$.

For simplicity, when gcd(m,n)$\neq$1 assume m=l, a prime. Suppose P is a point on E(k). Then $[n/l][l](P)=[n](P)$, so the image of [l] is a subgroup of E(k) of exponent n/l. In particular, if E(k) is a cyclic group then Im[l] is a subgroup of size n/l. Even in this case the problem can be solved. The problem is finding the pre-image of a point under an isogeny. Suppose gcd(n/l,l)=1. Then on the subgroup Im[l] the multiplication by [l] map is a permutation, thus it has an inverse. More precisely, if $l' \equiv l^{-1} \mod n/l$ then [l']P is a point in Im[l] that maps onto P via the multiplication by l-map. The proof is similar, if Q=[l']P then note that [n/l]Q=O and also [l]Q=[ll']P=P. Next described is the case that $l^2 || n$ and E[l] $\subset$ E(k). Then E(k)$\cong$(Z/mZ)$\times$(Z/mdZ) with l|m and gcd(m/l,l)=1. Let $l' \equiv l^{-1} \mod (n/l^2)$ where $(n/l^2)=m^2 d/l^2$. The map [l] is a permutation on the image of the multiplication by l-map on E(k) which as a group is isomorphic to Z/(m/l)Z$\times$Z/(md/l)Z. Taking Q=[l']P, we have that [l]Q=[ll']P and $ll' \equiv 1 \mod m^2 d/l^2$ and so $ll' \equiv 1 \mod m/l$ and also mod md/l. Thus, [l]Q=[1]P=P.

Let $\phi: E_1 \rightarrow E_2$ be an isogeny, let $\hat{\phi}$ be the dual, and $P \in E_2$. Set m=deg $\phi$. Then $[1/m]_{E_1} \hat{\phi}(P)$ is an inverse of P. Here, by $[1/m]_{E_1}$ is meant the procedure to invert the multiplication by [m] map on $E_1$ according to the preceding paragraph. This follows because:

$[1/m]_{E_1} \hat{\phi}(P)=[1/m]_{E_1} \hat{\phi}\phi(Q)$ where $P=\phi(Q)=[1/m]_{E_1}[m]_{E_1} Q=Q$. In this manner, an isogeny is inverted in the time used to evaluate $\hat{\phi}$.

As an example application, let $\phi: E_1 \rightarrow E_2$ be an isogeny. Then there is a bilinear pairing $e_\phi$: ker $\phi \times$ ker $\hat{\phi} \rightarrow \mu_{\deg \phi}$. This pairing satisfies the following useful property: $e_\phi(P,\phi(Q))=e_{\deg \phi}(P,Q)$ where the quantity on the right is a Weil pairing on the deg $\phi$-torsion points. Since the map $\phi: E_1[\deg] \rightarrow$ ker $\hat{\phi}$ is subjective (with kernel ker $\phi$). This identity is used to evaluate the $e_\phi$ pairing.

Let deg $\phi$=l be a prime degree isogeny. Assume that $E_1[l] \subset E_1(k)$ and also that $l^3$ does not divide #$E_1(k)$. Then, given $(P,Q) \in$ ker $\phi \times$ ker $\hat{\phi}$, and since Q is in the image of $\phi: E_1[l] \rightarrow E_2$, the isogeny $\phi$ is inverted as discussed above to find a point $R \in E_1[l]$ that maps to Q. A Weil-pairing $e_l(P,R)$ is computed to find the value of $e_\phi(P,Q)$. This provides a randomized polynomial time algorithm with one evaluation of the isogeny $\hat{\phi}$ to compute the Cartier pairing. Observe that if we have only $\phi$ in hand then we can still evaluate $e_\phi(P,Q)$ by using the fact that $e_\phi(P,Q)=e(Q,P)^{-1}$ and to compute the latter we compute $\phi$; it not being necessary to compute $\hat{\phi}$. In particular, if $\hat{\phi}$ or $\phi$ can be evaluated efficiently. In this manner, as system, such as system 100 in FIG. 1, can efficiently compute trapdoor pairings 114 based on the Cartier pairing. More information about Cartier pairings and their role in cryptography can be found in U.S. patent application Ser. No. 11/053,339 to Lauter et al., entitled "Crytographic Applications of the Cartier Pairing," which is incorporated by reference herein in its entirety.

Applied Trapdoor Pairing Schemata

Although the exemplary trapdoor pairing constructions just described have general applicability to cryptography, two exemplary applications are described below. It should be noted that it is possible to use a trapdoor pairing schema to provide heightened security in many types of pairing-based cryptographic protocols. Such cryptographic protocols include, for example, those used to implement identity-based cryptography (e.g., plain, blind, proxy, ring, undeniable, etc.), encryption protocols (e.g., authenticated, broadcast, encryption with keyword search, etc.), batch signatures, key agreement (plain, authenticated, group, etc.), trust authorities and public key certification, hierarchical cryptosystems, threshold cryptosystems and signatures, chameleon hash and signatures, authentication, applications and systems, access control, key agreement, non-interactive key distribution, credentials (e.g., anonymous, hidden, self-blindable, etc.), secret handshakes, provably secure signatures, short signatures, aggregate, ring, and verifiably encrypted signatures, blind and partially blind signatures, proxy signatures, undeniable signatures, sign-cryption, multi-signatures and threshold signatures, limited-verifier and designated-verifier signatures, threshold cryptosystems, hierarchical and role-based cryptosystems, chameleon hash and signatures, verifiable random functions, strongly insulated encryption, intrusion-resilient encryption, certificate-less PKC, al, traitor tracing, and/or so on. As a result, the systems and methods for cryptographic application of Trapdoor pairings 114 provide an alternative to pairing-based cryptographic systems that implement respective ones of such cryptographic protocols based on conventional ("unkeyed") Weil or Tate pairings evaluated at points on an elliptic curve or abelian variety.

Public Key Cryptography

Trapdoor pairing techniques can be used for public key encryption. For example, a user who knows the public information of one of the four constructions presented above, can encrypt original information by sending a random Diffie-Hellman triplet for the bit "1" and a random non-Diffie-Hellman triplet for the bit "0" (or vice versa). For example, this can be accomplished by selecting two random numbers a and b, and creating a valid Diffie-Hellman triplet when the current bit to be represented by a triplet is a "1." That is, such a triplet might be $g^a$, $g^b$, and $g^{ab}$. The triplet appears random to recipients who do not possess the secret trapdoor information 124 and thus do not have the ability to solve the DDH problem. To code a "0" bit, the user sends a random non-Diffie-Hellman triplet, such as $g^a$, $g^b$, and $g^c$. When the recipient in possession of the secret trapdoor information 124 receives such triplets and evaluates the trapdoor pairings 114, then solving the DDH problem reveals which bits are 1's and which bits are 0's.

Certification Authorities

For certificate authority (CA) infrastructures, trapdoor pairing technology can provide a new type of secure communication channel between a user and the certification authority. In one implementation, the CA possesses the secret trapdoor information 124 allowing the CA to construct public trapdoor pairing information (public groups), evaluate trapdoor pairings 114, and compute the DDH function on received data. In other word, by using trapdoor pairings 114, the CA wields a super-secure private key. This allows communication using the trapdoor pairing encryption protocol described above in the "public key cryptography" section.

Although some implementations of the trapdoor pairing-based encryption protocol may result in data intensive communications, such communications are very secure and can be used for specialized purposes, such as setting up a public key infrastructure, or when updated security elements are not in place yet. A common occurrence consists of implementing a new cryptographic protocol, where, in setting it up there is a need for a secure channel between users and the CA to give out initial information. Encryption using trapdoor pairings 114 is well-matched to such a scenario. Such encryption assumes that a user has to communicate with the CA only very infrequently, and hopefully with only small amounts of data. Thus, a CA may use trapdoor pairing-based communication when the CA is setting up a public key infrastructure for users. Similarly, a user may encrypt using trapdoor pairings 114 during special circumstances, such as establishing their credentials, or reverifying, updating, or revaliding credentials.

In the same or another implementation, the trapdoor pairing-based communication with a CA provides another benefit. Users can use any public key protocols in the public group for signing, key exchange, and encryption to each other without the CA having a trapdoor discrete log capability. This means that the users can encrypt messages to each other without the CA being able to decrypt the messages. However, the CA can execute a proof that the group order is prime without revealing the group order. In other words, the CA can reliably demonstrate that the system is secure, without giving away security secrets by so demonstrating. Again, for intentional communications with the CA, the user can be assured of high security using trapdoor pairing-based encryption, because the CA has the secret trapdoor information 124.

Exemplary Methods

Figure 2:
FIG. 2 is a flow diagram of an exemplary method of generating a trapdoor pairing.

FIG. 2 shows an exemplary method 200 of generating a trapdoor pairing. In the flow diagram, the operations are summarized in individual blocks. Parts of the exemplary method 200 may be performed by hardware, software, or combinations of both, for example, by components of the exemplary trapdoor pairing engine 110.

At block 202, a bilinear pairing is determined, e.g., between an elliptic group or other abelian variety and another group, such as a finite field group. The process of determining a bilinear pairing includes determining a trapdoor pairing function and one or more groups where the Decisional Diffie-Hellman (DDH) problem is computationally infeasible given only the description of the group(s), but is easy given a secret key. This allows a group to be made public for use in cryptography.

At block 204, a parameter of the bilinear pairing is selected to be the key. The key, or secret trapdoor information, can be one or more parameters of the bilinear pairing, for example, the key can be an order of a point or an elliptic curve used in the pairing, or can be a divisor of a group order of a point or elliptic curve used in the pairing. Or, the key can be an isogeny (mapping) between two curves, if the trapdoor pairing uses Cartier pairing. Evaluating the bilinear pairing is hard or infeasible without the key.

Figure 3:
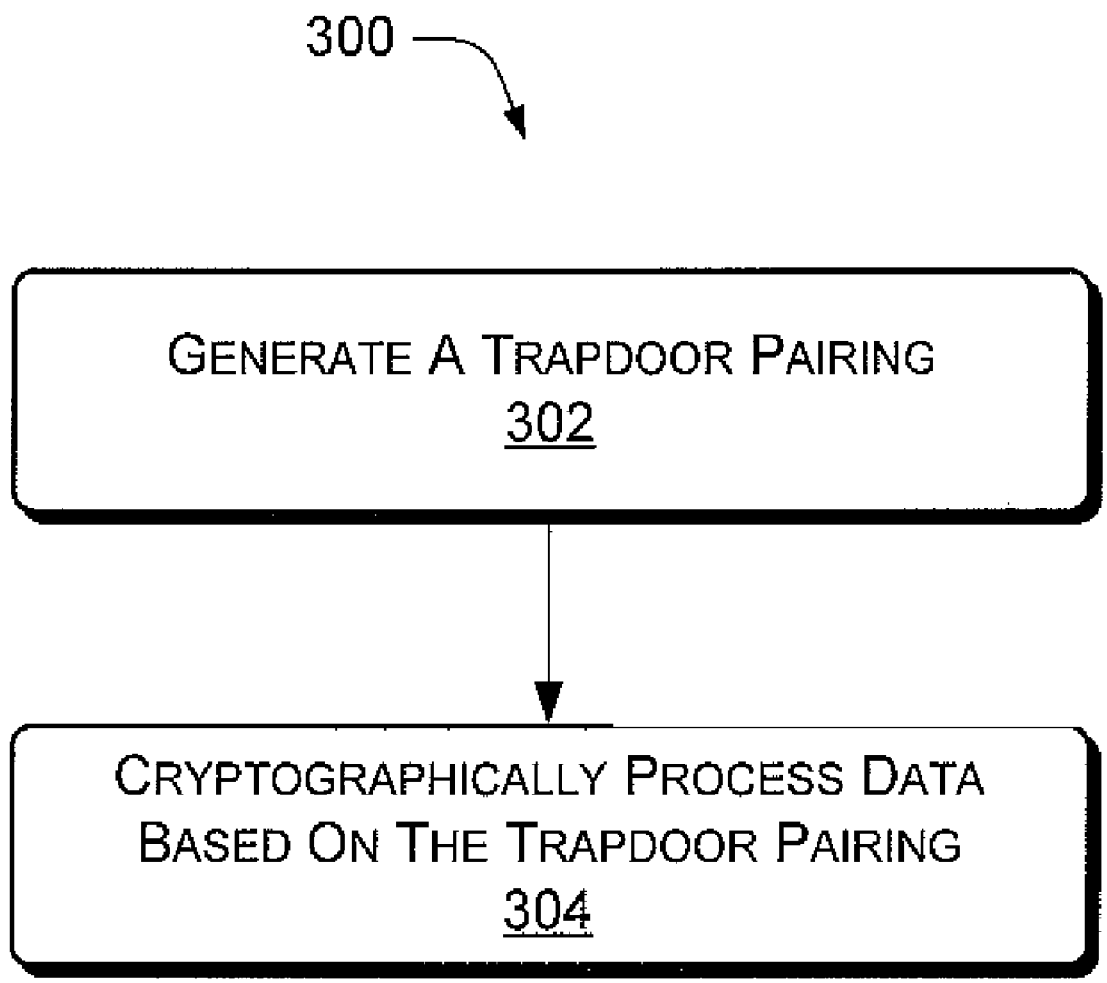
FIG. 3 is a flow diagram of an exemplary method of using a trapdoor pairing.

FIG. 3 shows an exemplary method 300 of using a trapdoor pairing. In the flow diagram, the operations are summarized in individual blocks. Parts of the exemplary method 300 may be performed by hardware, software, or combinations of both, for example, by components of the exemplary trapdoor pairing engine 110.

At block 302, a trapdoor pairing is generated. Generating a trapdoor pairing can include generating corresponding groups, a trapdoor pairing function, and secret trapdoor information. One or more of the groups can be made public and allow selection of group elements for use in cryptography, where pairing relationships between the selected elements are not discernable without the secret trapdoor information.

At block 304, data is cryptographically processed based on the trapdoor pairing. Trapdoor pairings can be generally used in pairing-based cryptography (encryption, decryption, signing, authentication, certification, key agreement, etc.), and more specifically can be used to construct a group where the Decisional Diffie-Hellman (DDH) problem is computationally infeasible given only the description of the group, but is easy given the secret key.

Figure 4:
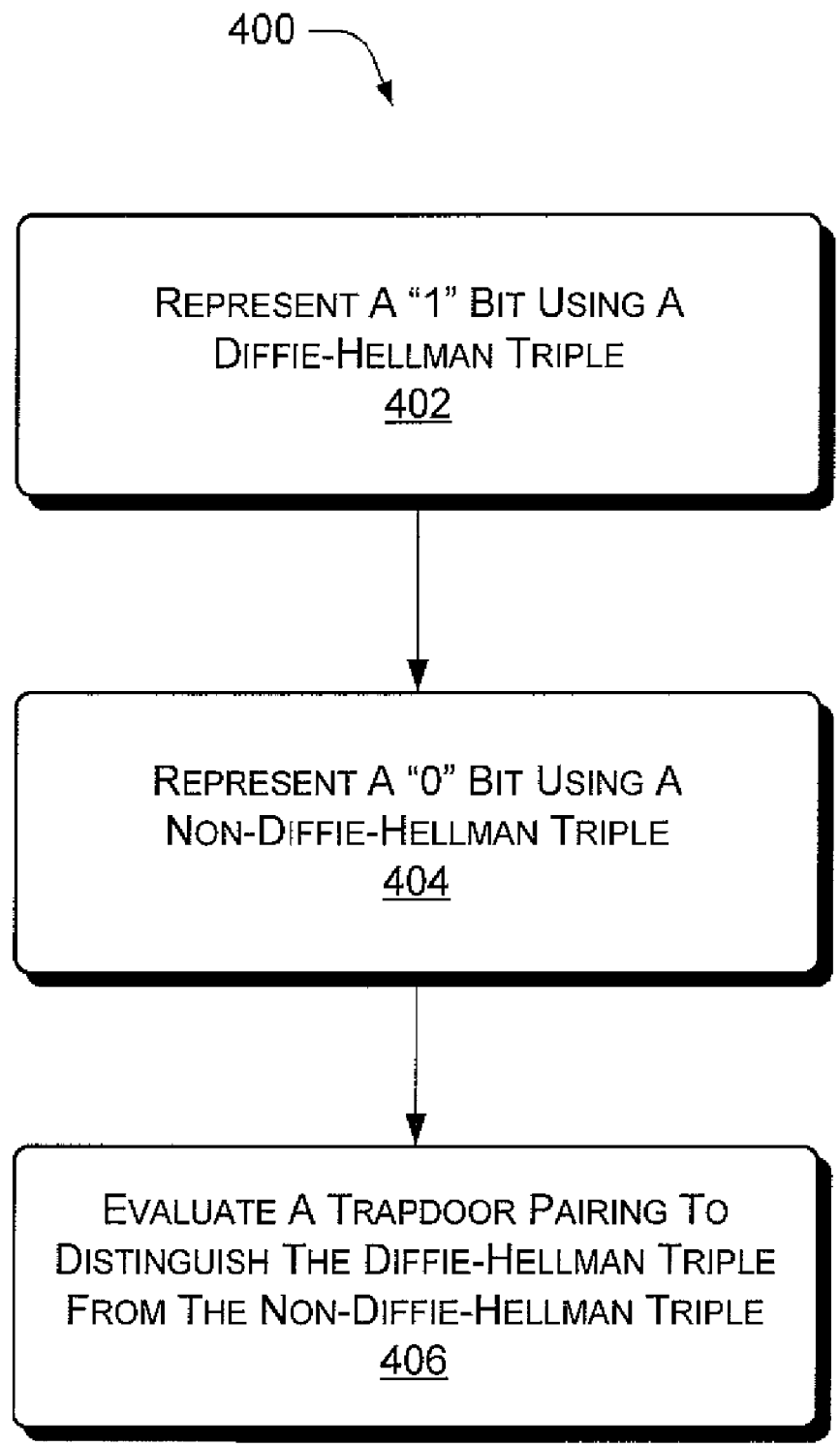
FIG. 4 is a flow diagram of an exemplary method of encrypting data.

FIG. 4 shows an exemplary method 400 of encrypting data. In the flow diagram, the operations are summarized in individual blocks. Parts of the exemplary method 400 may be performed by hardware, software, or combinations of both, for example, by components of the exemplary trapdoor pairing engine 110.

At block 402, a "1" bit of a digital data sequence is represented using a (decisional) Diffie-Hellman triple. The triple is typically calculated from a group that has been set up under an exemplary trapdoor pairing construction, as described above.

At block 404, a "0" bit is represented using a non-Diffie-Hellman triple. The non-Diffie-Hellman triple can typically be calculated from the same group as the valid Diffie-Hellman triple.

At block 406, a trapdoor pairing is evaluated in order to distinguish the Diffie-Hellman triple from the non-Diffie-Hellman triple. That is, by evaluating trapdoor pairings, the 1's and 0's of encrypted data can be distinguished. Since evaluating trapdoor pairings is infeasible without corresponding secret trapdoor information, data that has been encrypted based on groups and keyed pairing functions of a trapdoor pairing construction, is secure when the key is unknown.

Exemplary Operating Environment

Figure 5:
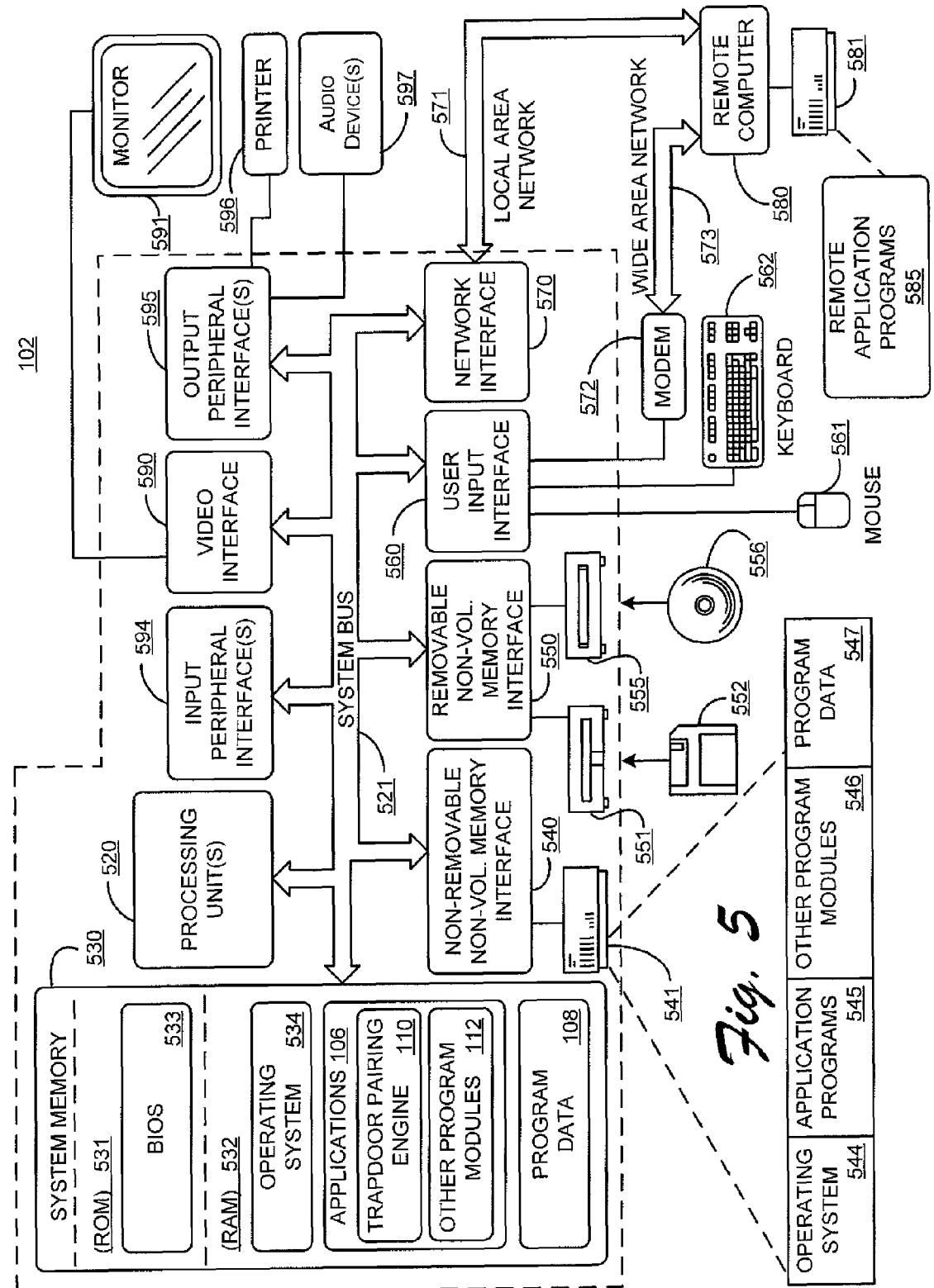
FIG. 5 is a block diagram of an exemplary computing device suitable for making and using exemplary trapdoor pairings.

FIG. 5 illustrates an example of a suitable computing device 102 in which cryptographic processing of data based on a trapdoor pairing 114 may be fully or partially implemented. Exemplary computing device 102 is only one example of a suitable computing environment for the exemplary system of FIG. 1 and exemplary operations of FIGS. 2-4, and is not intended to suggest any limitation as to the scope of use or functionality of systems and methods the described herein.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 5, an exemplary system for creating and evaluating trapdoor pairings 114 and cryptographically processing data based on trapdoor pairings 114 may include processing unit(s) 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computing device 102 typically includes a variety of computer-readable media. Computer-readable media can be any available media that can be accessed by computing device 102 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 102.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computing device 102, such as during start-up, is typically stored in ROM 531. RAM 532 typically contains data and/or program modules that are immediately accessible to and/or presently being operated on by processing unit 520. By way of example and not limitation, FIG. 5 illustrates operating system 534, applications 106, trapdoor pairing engine 110, other program modules 112, and program data 108. Program data 108 includes, for example, trapdoor pairings 114 and other program data of computing devices 102 or 104 of FIG. 1.

The computing device 102 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer-readable instructions, data structures, program modules and other data for the computing device 102. In FIG. 5, for example, hard disk drive 541 is illustrated as storing operating system 544, application programs 545, other program modules 546, and program data 547. Note that these components can either be the same as or different from operating system 534, applications 106, other program modules 112, and program data 108. Applications 106 may include, for example, the exemplary trapdoor pairing engine 110, and other program modules 112 of computing device 102 (or 104) of FIG. 1. Program data 108 includes, for example, trapdoor pairings 114 and other program data of computing devices 102 or 104 of FIG. 1. Operating system 544, application programs 545, other program modules 546, and program data 547 are given different numbers here to illustrate that they are at least different copies.

A user may enter commands and information into the computing device 102 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB).

A monitor 591 or other type of display device is also connected to the system bus 521 via an interface, such as a video interface 590. In addition to the monitor, computers may also include other peripheral output devices such as printer 596 and audio device(s) 597, which may be connected through an output peripheral interface 595.

The computing device 102 operates in a networked environment using logical connections to one or more remote computers, such as a remote computer 580. In one implementation, remote computer 580 represents either computing device 102 or networked computer 104 of FIG. 1. The remote computer 580 may be a personal computer, a server, a router, a network PC, a peer device or other common network node, and as a function of its particular implementation, may include many or all of the elements described above relative to the computing device 102, although only a memory storage device 581 has been illustrated in FIG. 5. The logical connections depicted in FIG. 5 include a local area network (LAN) 581 and a wide area network (WAN) 573, but may also include other networks. Such networking environments are commonplace in offices, enterprise-wide computer networks, intranets and the Internet.

When used in a LAN networking environment, the computing device 102 is connected to the LAN 571 through a network interface or adapter 570. When used in a WAN networking environment, the computing device 102 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computing device 102, or portions thereof, may be stored in the remote memory storage device. By way of example and not limitation, FIG. 5 illustrates remote application programs 585 as residing on memory device 581. The network connections shown are exemplary and other means of establishing a communications link between the computers may be used.

CONCLUSION

The subject matter described above can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary trapdoor pairing. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
    generating a trapdoor pairing, wherein the trapdoor pairing comprises a keyed bilinear map e: $G1 \times G2 \rightarrow G3$ from a first elliptical curve group G1 and a second elliptical curve group G2 of elliptic curve E to a finite field third group G3, wherein the trapdoor pairing possesses properties including:
        a description of groups G1 and G2 having respective generators P and Q, and a Decisional Diffie-Hellman (DDH) problem with respect to group G1 and group G2 that is hard;
        secret trapdoor information with which the keyed bilinear map can be efficiently evaluated; and
        an evaluation of the trapdoor pairing using the secret trapdoor information to reveal that at least a part of the bilinear map does not reveal the secret trapdoor information, wherein the trapdoor pairing comprises a trapdoor pairing construction in which:
            the secret trapdoor information comprises an isogeny between two elliptic curves E1 and E2;
            public information includes $\langle P \rangle = \ker(\phi)$, $\langle Q \rangle = \ker(\hat{\phi})$;
            G3 comprises the mth roots of 1, wherein m is prime; and
            a trapdoor pairing function for generating and/or evaluating the trapdoor pairing using the secret trapdoor information is denoted by $e_\phi(A, B) := e_m(A, \phi^{-1}B)$, wherein m denotes a degree of the isogeny that is equal to the size of the kernel of $\phi$, the A comprises a point on elliptic curve E1 in the kernel of $\phi$, the B denotes a point on elliptic curve E2 in the kernel of the dual isogeny $\hat{\phi}$, wherein $e_m(A, \phi^{-1}B)$ is the $m^{th}$ Weil pairing on the elliptic curve E1; and
    cryptographically processing data based on the trapdoor pairing, such that evaluations of random Diffie-Hellman triplets and random non-Diffie-Hellman triplets indicate 0 bits and 1 bits or 1 bits and 0 bits.

2. The method as recited in claim 1, wherein the trapdoor pairing comprises a Weil pairing or a Tate pairing generated in part from secret information.

3. The method as recited in claim 1, wherein generating the trapdoor pairing comprises generating a Cartier pairing at least in part from secret information.

4. The method as recited in claim 3, wherein generating the Cartier pairing includes generating the Cartier pairing from two different abelian varieties and an isogeny between them.

5. A computer-implemented method comprising:
generating a trapdoor pairing, the trapdoor pairing comprises a keyed bilinear map e: G1×G1→G2 from a first elliptic curve group G1 of elliptic curve E to a finite field second group G2, wherein the trapdoor pairing possesses properties including:
a description of group G1 as a Decisional Diffie-Hellman (DDH) problem with respect to group G1 that is hard;
secret trapdoor information enabling the keyed bilinear map to be efficiently evaluated so that the DDH problem with respect to group G1 is not hard; and
an evaluation of the trapdoor pairing using the secret information to reveal that at least a part of the bilinear map does not reveal the secret information;
cryptographically processing data based on the trapdoor pairing; and
cryptographically processing data based on the trapdoor pairing, such that evaluations of random Diffie-Hellman triplets and random non-Diffie-Hellman triplets indicate 0 bits and 1 bits or 1 bits and 0 bits.

6. The method as recited in claim 5, wherein the trapdoor pairing comprises a first trapdoor pairing construction in which:
n comprises an order of a point P on the elliptic curve E used to generate group G1 and n=pq where p and q are prime factors of n;
the secret information comprises p, q, and the group G2;
public information includes n, E over a finite field, point P, and group G1; and
a trapdoor pairing function for generating or evaluating the trapdoor pairing using the secret information comprises e(A, B): $e_p(qA, qf(B))$, $e_q(pA, pf(B))$, wherein the $(e_p(qA, qf(B)), e_q(pA, pf(B))$ comprises a Weil pairing, the A and the B are points on the elliptic curve E, and the f comprises a distortion map of the elliptic curve E.

7. The method as recited in claim 5, wherein the trapdoor pairing comprises a second trapdoor pairing construction in which:
n comprises an integer and n=pq where p and q are prime factors of n;
rs comprises a divisor of a group order of $|E(Z_n)|$, wherein r and s are factors of the divisor, E is the elliptic curve, and $Z_n$ comprises a set of integers modulo n;
the secret information includes p, q, and rs;
public information includes n, E over $Z_n$, point P of order rs on the elliptic curve E; and
a trapdoor pairing function for generating or evaluating the trapdoor pairing using the secret information comprises e(A, B): $e_r(sA, sf(B))$ over $Z_p$, $e_s(rA, rg(B))$ over $Z_q$, wherein the $(e_r(sA, sf(B))$ over $Z_p$, $e_s(rA, rg(B))$ over $Z_q$) comprises a Weil pairing, the A and the B are points on the elliptic curve E, the f and the g comprise distortion maps of the elliptic curve E, the $Z_p$ comprises a set of integers modulo p, and the $Z_q$ comprises a set of integers modulo q.

8. The method as recited in claim 5, wherein the trapdoor pairing comprises a third trapdoor pairing construction in which:
n comprises an integer and n=pq where p and q are prime factors of n;
r comprises a prime divisor of a group order of $|E(Z_n)|$, wherein E is the elliptic curve, and $Z_n$ comprises a set of integers modulo n;
the secret information includes p, q, and r,
public information includes n, E over $Z_n$, point P of order r on the elliptic curve E; and
a trapdoor pairing function for generating or evaluating the trapdoor pairing using the secret information comprises e(A, B): $e_r(A, f(B))$ over $Z_p$, $e_r(A, g(B))$ over $Z_q$, wherein the $(e_r(A, f(B))$ over $Z_p$, $e_r(A, g(B))$ over $Z_q$) comprises a Weil pairing, the A and the B are points on the elliptic curve E, the f and the g comprise distortion maps of the elliptic curve E, the $Z_p$ comprises a set of integers modulo p, and the $Z_q$ comprises a set of integers modulo q.

9. The method as recited in claim 1, further comprising using a trapdoor pairing function to evaluate the trapdoor pairing in order to perform a subsequent cryptographic process on the cryptographically processed data.

10. The method as recited in claim 1, wherein the evaluations of the random Diffie-Hellman triplets and the random non-Diffie-Hellman triplets include evaluating the trapdoor pairing using secret information.

11. The method as recited in claim 1, wherein cryptographically processing the data based on the trapdoor pairing includes secure communication with a certificate authority, wherein the certificate authority has secret information for evaluating trapdoor pairings used to create the secure communication.

12. A computer-implemented method that facilitates construction of trapdoor pairings, the method comprising:
generating a keyed bilinear map as a trapdoor pairing via a trapdoor pairing function that uses secret trapdoor information such that the trapdoor pairing is hard to evaluate without the secret trapdoor information and the trapdoor pairing is not hard to evaluate with the secret trapdoor information, wherein evaluating the secret trapdoor information includes a pairing function from at least two groups: a first elliptic curve group G1 and another finite field second group G2;
using a trapdoor pairing function to evaluate the trapdoor pairing in order to perform a subsequent cryptographic process on the cryptographically processed data;
cryptographically processing data based on the trapdoor pairing, the cryptographical processing includes:
encrypting the data in part by sending a random Diffie-Hellman triplet for a first bit and a random non-Diffie-Hellman triplet for a second bit, the first and second bits of different value, the validity of a Diffie-Hellman triplet being determined by evaluating the trapdoor pairing using the secret trapdoor information; and
ensuring secure communication with a certificate authority, wherein the certificate authority has the secret trapdoor information for evaluating trapdoor pairings used to create the secure communication.

13. The method as recited in claim 12, wherein the trapdoor pairing comprises a keyed bilinear map e: G1×G1→G2 from the first elliptic curve group G1 of elliptic curve E to the finite field second group G2, wherein the trapdoor pairing possesses properties including:
a description of group G1 as a Decisional Diffie-Hellman (DDH) problem that is hard with respect to group G1;

secret trapdoor information, configured to allow efficient evaluation of the keyed bilinear map so that the DDH problem with respect to group G1 is not hard; and an evaluation of the trapdoor pairing using the secret trapdoor information to reveal at least a part of the bilinear map does not reveal the secret trapdoor information.

14. The method as recited in claim 13, wherein the trapdoor pairing comprises a first trapdoor pairing construction in which:

n comprises an order of a point P on the elliptic curve E used to generate group G1 and n=pq where p and q are prime factors of n;

the secret trapdoor information comprises p, q, and the group G2;

public information includes n, E over a finite field, point P, and group G1; and a trapdoor pairing function for generating or evaluating the trapdoor pairing using the secret trapdoor information comprises e(A, B): $e_p$(qA, qf(B)), $e_q$(pA, pf(B)), wherein the ($e_p$(qA, qf(B)), $e_q$(pA, pf(B)) comprises a Weil pairing, the A and the B are points on the elliptic curve E, and the f comprises a distortion map of the elliptic curve E.

15. The method as recited in claim 13, wherein the trapdoor pairing comprises a second trapdoor pairing construction in which:

n comprises an integer and n=pq where p and q are prime factors of n;

rs comprises a divisor of a group order of $|E(Z_n)|$, wherein r and s are factors of the divisor, E is the elliptic curve, and $Z_n$ comprises a set of integers modulo n;

the secret trapdoor information includes p, q, and rs;

public information includes n, E over $Z_n$, point P of order rs on the elliptic curve E; and a trapdoor pairing function for generating or evaluating the trapdoor pairing using the secret trapdoor information comprises e(A, B): $e_r$(sA, sf(B)) over $Z_p$, $e_s$(rA, rg(B)) over $Z_q$, wherein the ($e_r$(sA, sf(B)) over $Z_p$, $e_s$(rA, rg(B)) over $Z_q$) comprises a Weil pairing, the A and the B are points on the elliptic curve E, the f and the g comprise distortion maps of the elliptic curve E, the $Z_p$ comprises a set of integers modulo p, and the $Z_q$ comprises a set of integers modulo q.

16. The method as recited in claim 13, wherein the trapdoor pairing comprises a third trapdoor pairing construction in which:

n comprises an integer and n=pq where p and q are prime factors of n;

r comprises a prime divisor of a group order of $|E(Z_n)|$, wherein E is the elliptic curve, and $Z_n$ comprises a set of integers modulo n;

the secret trapdoor information includes p, q, and r;

public information includes n, E over $Z_n$, point P of order r on the elliptic curve E; and a trapdoor pairing function for generating or evaluating the trapdoor pairing using the secret trapdoor information comprises e(A, B): $e_r$(A, f(B)) over $Z_p$, $e_r$(A, g(B)) over $Z_q$, wherein the ($e_r$(A, f(B)) over $Z_p$, $e_r$(A, g(B)) over $Z_q$) comprises a Weil pairing, the A and the B are points on the elliptic curve E, the f and the g comprise distortion factors of the elliptic curve E, the $Z_p$ comprises a set of integers modulo p, and the $Z_q$ comprises a set of integers modulo q.

17. A computer implemented method, comprising: under control of one or more processors configured with executable instructions:

generating a trapdoor pairing via a trapdoor pairing function that uses secret trapdoor information such that the trapdoor pairing is hard to evaluate without the secret trapdoor information and the trapdoor pairing is not hard to evaluate with the secret trapdoor information;

using a trapdoor pairing function to evaluate the trapdoor pairing in order to perform a subsequent cryptographic process on the cryptographically processed data;

cryptographically processing data based on the trapdoor pairing, the cryptographical processing includes:

encrypting the data in part by sending a random Diffie-Hellman triplet for a first bit and a random non-Diffie-Hellman triplet for a second bit, the first and second bits of different value, the validity of a Diffie-Hellman triplet being determined by evaluating the trapdoor pairing using the secret trapdoor information; and ensuring secure communication with a certificate authority, wherein the certificate authority has the secret trapdoor information for evaluating trapdoor pairings used to create the secure communication;

determining a keyed bilinear map e: G1×G2→G3 from a first elliptical curve group G1 and a second elliptical curve group G2 of elliptic curve E to a finite field third group G3, wherein the trapdoor pairing possesses properties including:

a description of groups G1 and G2 having respective generators P and Q, such that a Decisional Diffie-Hellman (DDH) problem with respect to group G1 and group G2 is hard;

secret trapdoor information, configured to allow efficient evaluation of the keyed bilinear map; and an evaluation of the trapdoor pairing using the secret trapdoor information to reveal at least a part of the bilinear map does not reveal the secret trapdoor information;

a trapdoor pairing construction in which:

the secret trapdoor information comprises an isogeny between two elliptic curves E1 and E2;

public information includes <P>=ker(φ), <Q>=ker(φ̂);

G3 comprises the mth roots of 1, wherein m is prime; and generating or evaluating the trapdoor pairing function for the trapdoor pairing using the secret trapdoor information, the trapdoor pairing function denoted by $e_\varphi$(A, B):=$e_m$(A, $\varphi^{-1}$B), wherein m denotes a degree of the isogeny that is equal to the size of the kernel of φ, the A comprises a point on elliptic curve E1 in the kernel of φ, the B denotes a point on elliptic curve E2 in the kernel of the dual isogeny φ̂, wherein $e_m$(A, φ̂$^1$B) is the $m^{th}$ Weil pairing on the elliptic curve E1.

\* \* \* \* \*